United States Patent [19]

Okada

[11] Patent Number: 4,952,834

[45] Date of Patent: Aug. 28, 1990

[54] CIRCUITRY FOR DRIVING ULTRASONIC MOTOR

[75] Inventor: Junji Okada, Hachioji, Japan

[73] Assignee: Olympus Optical Co., Ltd., Japan

[21] Appl. No.: 321,993

[22] Filed: Mar. 10, 1989

[30] Foreign Application Priority Data

Mar. 14, 1988 [JP] Japan .................. 63-059583

[51] Int. Cl.$^5$ ............................................ H01L 41/08
[52] U.S. Cl. ...................................... 310/316; 310/323
[58] Field of Search ............... 310/316, 317, 323, 328; 318/116, 118

[56] References Cited

U.S. PATENT DOCUMENTS

| 4,277,710 | 7/1981 | Harwood et al. | 310/316 |
| 4,794,294 | 12/1988 | Shimizu et al. | 310/316 |
| 4,833,358 | 5/1989 | Suzuki et al. | 310/316 |

FOREIGN PATENT DOCUMENTS

| 0073793 | 1/1987 | Japan | 310/323 |
| 0086685 | 4/1987 | Japan | 310/323 |

Primary Examiner—Mark O. Budd
Attorney, Agent, or Firm—Louis Weinstein

[57] ABSTRACT

Circuitry for driving an ultrasonic motor in which a rotor is driven by travelling waves generated by a piezoelectric effect, which circuitry includes a pulse generator for generating pulses applied to the ultrasonic motor for driving the same, a driving pulse width changing circuit for changing the width of the driving pulse to change the rotational speed of the motor, a feed-back piezoelectric element provided on the motor for generating a feed-back signal in response to the rotational speed of motor, and a driving frequency automatic tracking circuit responsive to the feed back signal from the motor for generating a voltage signal to control the pulse generator.

19 Claims, 4 Drawing Sheets

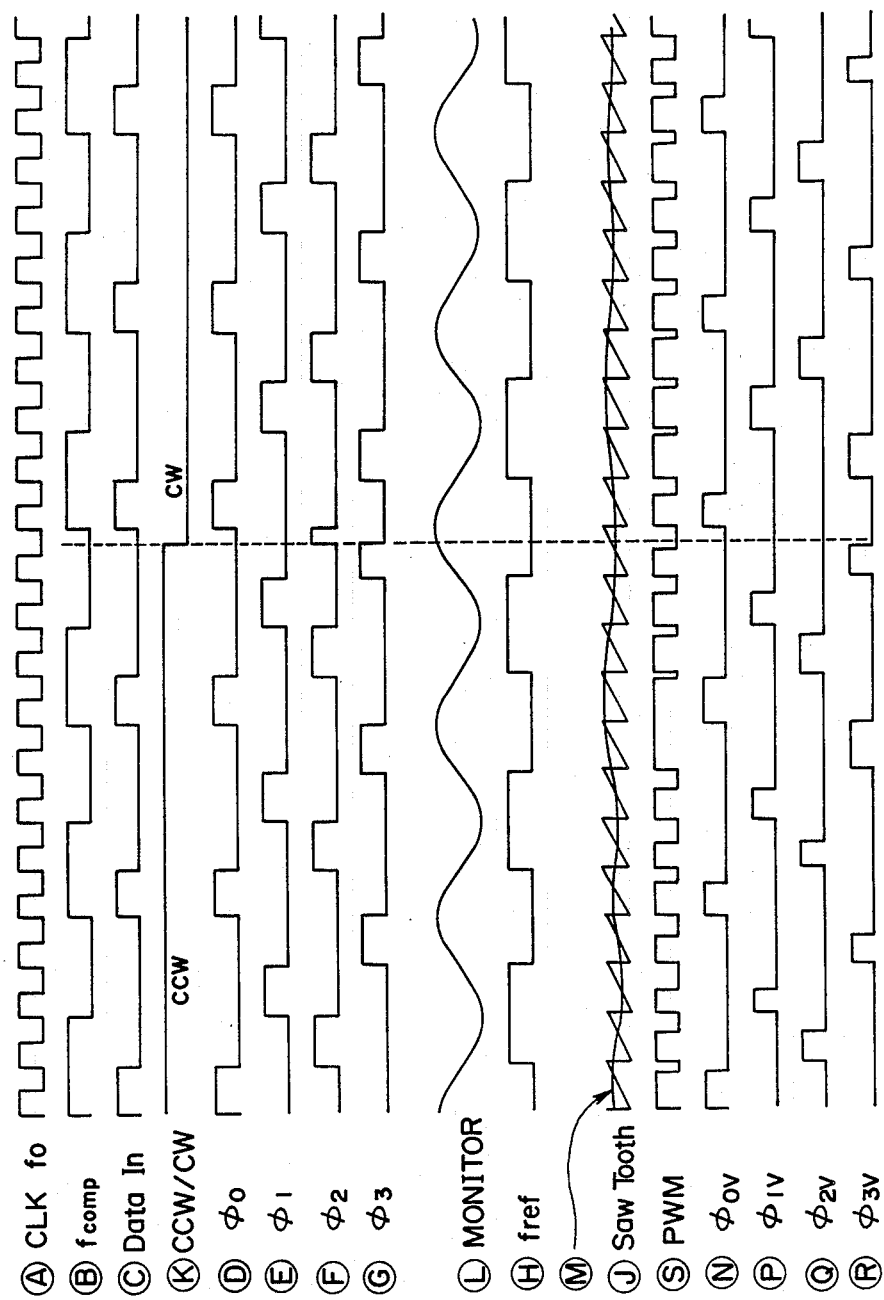

CIRCUITRY FOR DRIVING ULTRASONIC MOTOR

FIELD OF THE INVENTION AND RELATED ART STATEMENT

The present invention relates to a circuitry for driving an ultrasonic motor and in particular to circuitry for driving an ultrasonic motor in which a rotor is driven by travelling waves which are generated by a piezoelectric effect.

Recently an ultrasonic motor has been proposed in which a movable member (rotor) which is in frictional contact relationship with the surface of an elastic member is forcedly moved by applying an alternating voltage to a piezoelectric element secured to said elastic member to generate travelling vibration waves upon the surface of the elastic member as is different from a conventional electromagnetically driven motor. This motor is also referred to as vibration motor (hereinafter abbreviated to as USM) and is simple in structure and may be made compact. This motor attracts attention as a new actuator since direct drive is possible without using any reduction gear due to its high torque and low rotational speed. Such a motor has already been used as an actuator for automatic focussing in the field of camera.

Driving of a USM is carried out by applying two alternating voltages having similar amplitude and frequency, $\pi/2(=90°)$ phase shift to a polarization treated piezoelectric element at two positions which are in a spatial relationship $\pi/4+n\lambda$ (n is an integer and $\lambda$ is a wave length of a travelling wave) with each other. At this time, the driving frequency should be preset to a frequency in the vicinity of a resonant frequency inherent to the USM. However the resonant frequency of the USM is gradually and slightly deviated due to changes in load, biasing force between a rotor and a stator of the USM, and environmental conditions such as temperature and applied voltage. Accordingly it is necessary to cause the driving frequency to automatically track an optimal frequency for driving the motor. The present inventors have proposed an apparatus for driving an ultrasonic motor in which a driving frequency is automatically tracked by a PLL (Phase Locked Loop) system as is disclosed in Japanese Patent Application Sho 62-66750 (Japanese Laid-Open Patent Application Sho 63-234881).

In order to use a USM as an actuator, it is essential to enable to adjust the rotational speed of the USM.

FIG. 6 shows a relation between a rotational speed and a driving frequency when the voltage which is applied to a driving electrode of the USM is constant. As is apparent from FIG. 6, the rotational speed is a maximum at a frequency fI in the vicinity of a resonant frequency fr. The rotational speed is exponentially lowered as is shown by a solid line $l_{3a}$ if the driving frequency is shifted to a higher frequency as is shown, for example, fII. This means that lowering of the efficiency of the motor and the driving circuit causes lowering of the rotational speed of the motor. At a driving frequency lower than the resonant frequency fr, the driving condition of the USM is so unstable that the rotation of the USM is stopped (this is referred to as "locked") as shown by a dotted line $l_{3b}$. On the other hand, if the driving frequency is made constant and the voltage applied to the USM is made variable, the range of changes in rotational speed is narrow as shown by solid line $l_{4a}$ at a driving frequency fI in the vicinity of resonant frequency as shown in FIG. 7. Furthermore an increase in applied voltage causes the rotational voltage to saturate as shown by a dotted line $l_{4b}$. Conversely, lowering the applied voltage causes the USM to lock as shown by a dotted line $l_{4c}$. Smooth rotation over a range from a still condition to a maximum speed may not be obtained. It is considered that this is due to the fact that lowering the applied voltage shifts the resonant frequency to a higher frequency so that the USM ceases rotation when the driving frequency fI became lower than the resonant frequency fr.

At a driving frequency fII far from the resonant frequency fr, the maximum rotational speed is suppressed low although smooth rotation may be obtained from a still condition as shown by a linear line $l_5$. The range of changes in rotational speed is also narrow. This is due to the fact that lowering of the efficiency of the USM and the driving circuit causes the motor speed to lower.

Such a speed control by shifting the driving frequency from the resonant frequency of USM is contradictory to an automatic frequency tracking for driving the USM as efficiently as possible.

An approach has been proposed that changing phase the difference between two phase signals (generally $\pi/2$) which drive the USM to decrease the travelling wave component of the elastic member surface and to increase the standing wave component for lowering the rotational speed of the USM. However this approach also lowers the efficiency of the USM and the driving circuit to lower the motor's rotational speed.

OBJECT AND SUMMARY OF THE INVENTION

It is an object of the present invention to provide circuitry for driving an ultrasonic motor in which speed control can be linearly made over a wide range from a still condition to a maximum speed of rotation at a high efficiency without lowering the efficiency of motor and driving circuit while maintaining the driving frequency at a constant frequency in the vicinity of a resonant frequency.

The following remarkable effects are exhibited in accordance with the present invention. Comparison of the phase of a control signal which drives and controls an ultrasonic motor with the phase of a feed-back signal generated due to a piezoelectric effect by a driving voltage is carried out to provide an error signal to control an oscillation frequency of a voltage controlled oscillator for automatically tracking an optimum driving frequency of the ultrasonic motor. Simultaneously the pulse width of four phase signals which are successively 90° phase shifted with each other to drive an output circuit for driving a motor is changed with time by a pulse width modulation. Accordingly, circuitry for driving an ultrasonic motor in which the rotational speed of the motor can be linearly changed from a still condition to a maximum high speed as shown in FIG. 5 without lowering the efficiency of motor and circuit can be provided.

BRIEF DESCRIPTION OF THE DRAWINGS

FIG. 4 is a timing chart showing waveforms of signals at different positions FIG. 2;

DETAILED DESCRIPTION OF DREFERRED EMBODIMENTS

Figure 1:
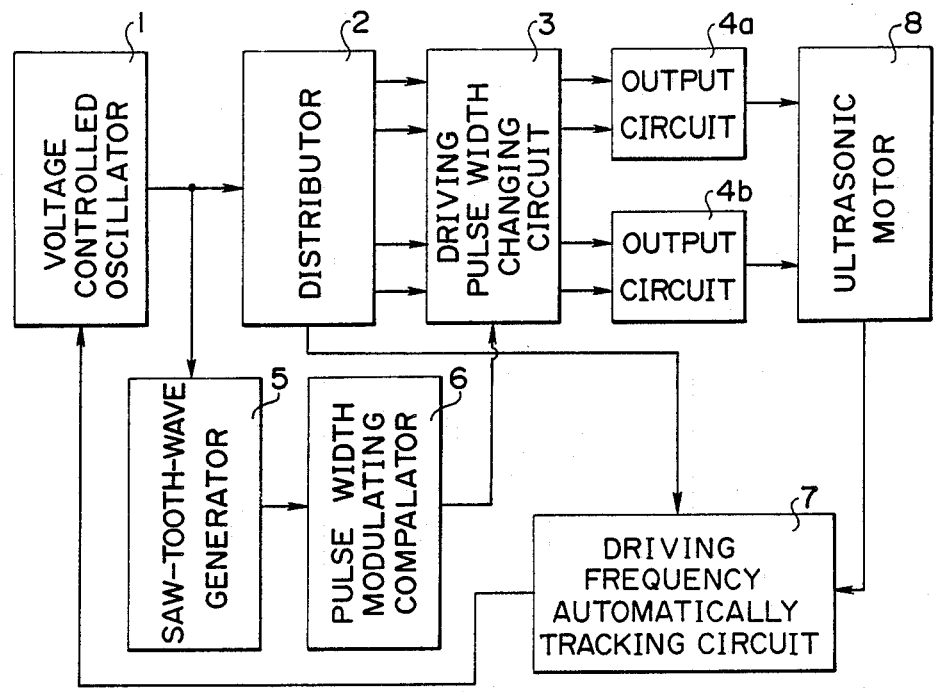
FIG. 1 is a schematic block diagram showing circuitry for driving an ultrasonic motor in accordance with the present invention.

Referring now to FIG. 1, there is shown circuitry for driving an ultrasonic motor (not shown) in which a moving member which is in a frictional contact relationship with the surface of an elastic member is forcedly moved by applying an alternating voltage to a piezoelectric element secured to said elastic member to generate travelling vibration waves upon the surface of the elastic member. The circuitry for driving an ultrasonic motor comprises a voltage controlled oscillator 1 for generating rectangular waves having a frequency of 4n times (where n is an integer) as high as that of the alternating voltage to be applied to the piezoelectric element; a distributor 2 for separating and distributing the rectangular waves into four phase pulse waves ($\phi_0$, $\phi_1$, $\phi_2$, $\phi_3$ wherein $\phi_0$ and $\phi_1$; $\phi_2$ and $\phi_3$ are 180° out of phase with each other; $\phi_0$ and $\phi_2$, $\phi_1$ and $\phi_3$ being 90° out of phase with each other) as shown in FIG. 4; a saw-tooth-wave generator 5 for generating saw-tooth-waves which are in synchronization with said rectangular waves; a pulse width modulating comparator 6 for comparing the level of said saw-tooth-wave signals with that of a reference voltage; a driving pulse width changing circuit 3 for changing the width of the four phase pulses in response to the output from said pulse width modulating comparator 6; output circuits 4a, 4b which combine 180° out-of phase pulses ($\phi_0$ with $\phi_1$, $\phi_2$ with $\phi_3$, the pulse width of which have been changed by said driving pulse width changing circuit 3 and amplify the combined pulses to apply them to said piezoelectric element as two 90° out-of-phase alternating voltages; a feed-back piezoelectric element secured to said elastic member for generating a feed back signal due to piezoelectric effect on driving of the ultrasonic motor; and a driving frequency automatically tracking circuit 7 responsive to said feed back signal for outputting to said voltage controlled oscillator 1 a voltage signal representative of a difference between an optimum driving freqency and the current driving freqency.

Figure 2:
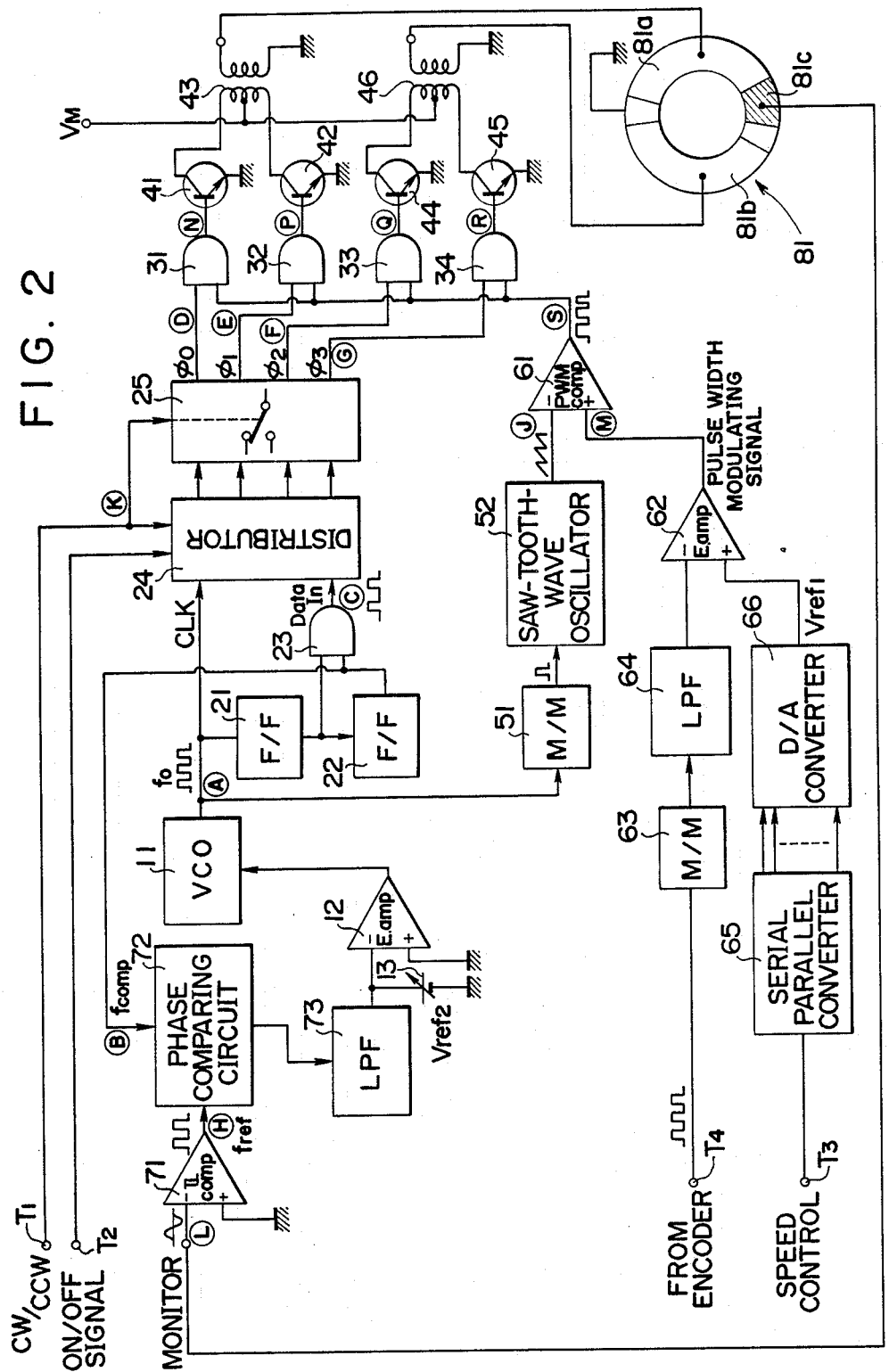
FIG. 2 is a block diagram showing an embodiment of circuitry for driving an ultrasonic motor of the present invention.
Figure 5:
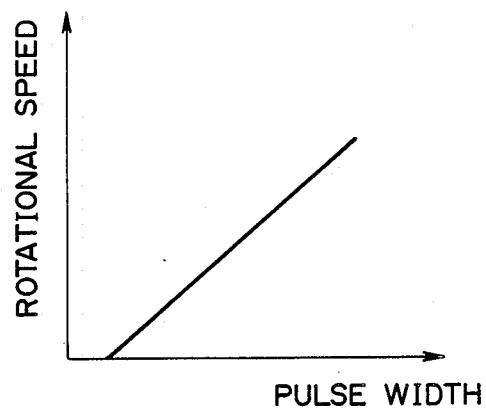
FIG. 5 is a graph showing the relation between the pulse width of a driving signal applied to driving electrodes of an ultrasonic motor and the rotational speed of the motor.
Figure 6:
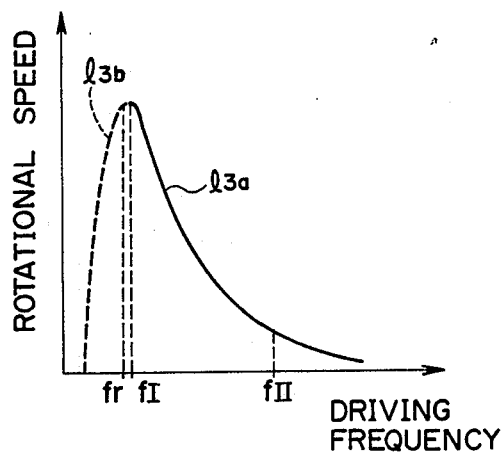
FIG. 6 is a graph showing the relation between the frequency of the driving signal and the rotational speed of a conventional motor.
Figure 7:
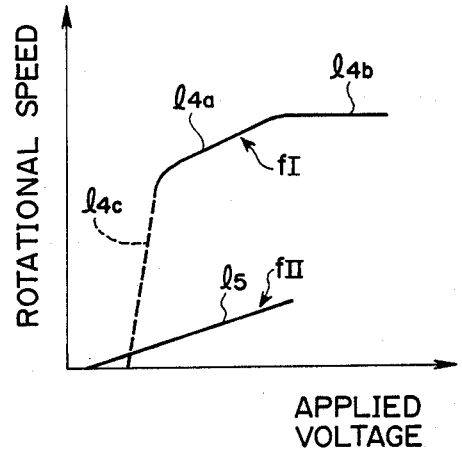
FIG. 7 is a graph showing the relation between the applied voltage and the rotational speed of a conventional motor.

Referring now to FIG. 2, there is shown an embodiment of the circuitry for driving an ultrasonic motor of the present invention.

A voltage controlled oscillator 11 (hereinafter referred to as a VCO) is controlled by an error amplifier 12 so that the oscillator 11 outputs a rectangular signal A having a frequency of 4 times that of a driving voltage signal for USM 81. The error amplifier 12 has an inverting input, to which an oscilation frequency controlling reference voltage V ref2 from a variable power supply 13 is applied. The frequency $f_0$ is adjusted by adjusting the reference voltage V ref2. The oscillator may generate a signal whose frequency is 4n times that of the driving signal. In this case, the signal is divided by 4n by a suitable frequency divider which is provided at a following stage. The rectangular signal A having a frequency $f_0$ is applied to a distributor 24 as a clock pulse and is applied to a flip-flop circuit 21 (hereinafter referred to as F/F). The output signal from the F/F 21, the frequency of which has been divided by 2 is applied to one input of an AND gate 23 and is applied to F/F 22. The signal is furthermore divided by 2 by F/F 22. As a result, a signal divided by 4 is applied to another input of the AND gate 23. Since a data signal C is obtained from the output of the AND gate 23, the data signal C is applied to a distributor 24 as a D input.

The distributor 24 comprises a 4-bit shift register having four outputs. Four phase signals $\phi_0$, $\phi_2$, $\phi_1$ and $\phi_3$ which are successively spaced at 90° phase intervals are outputted from the outputs of the register through a switching circuit 25. The waveforms D, E, F, G and timing relationship of the signals are shown in FIG. 4. Turning ON and OFF signals which control the operation and stop of USM81 respectively and a rotational direction changing signal K which controls the direction of the rotation of USM are applied to terminals $T_2$ and $T_1$ respectively. The signals $\phi_0$ and $\phi_1$ which are 180° out of phase with each other are applied through AND gates 31 and 32, which will be described hereafter, to a push-pull amplifying circuit comprising a pair of transistors 41 and 42 and a step-up transformer 43 for driving the amplifying circuit. Similarly, signals $\phi_2$ and $\phi_3$ drive via AND gates 33 and 34 a push-pull amplifying circuit comprising transistors 44 and 45 and a step-up transformer 46. A power supply voltage $V_M$ is supplied to center taps of the step-up transformers 43 and 46.

As a result of this, driving voltages having a 90° phase difference are applied to driving terminals 81a and 81b of the USM81. An elastic member of USM81 causes expansion and contraction thereof to generate travelling waves. The expansion and contraction of the elastic member causes a monitor piezoelectric element on the USM 81 to generate a feed-back signal L at the electrode 81c of the element due to the piezoelectric effect. Since the feed-back signal L represents the vibration of the elastic member per se, a reference frequency signal H which has been obtained by waveshaping the feed-back signal in a comparator 71 is compared in phase with a comparison signal B output from the F/F22 by a phase comparison circuit 72 to detect a phase error between the VCO oscillation frequency divided by four and a resonant frequency. The phase error signal is smoothed by a LPF 73 (Low pass filter) and is fed back to a voltage control terminal of VCO 11 through an error amplifier 12 for accomplishing automatic frequency tracking. If an automatic frequency tracking is carried out in such a manner, driving can always be carried out efficiently at an optimum frequency point.

Figure 3:
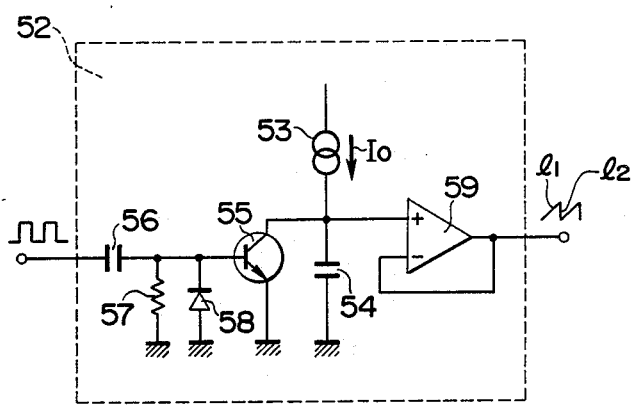
FIG. 3 is a wiring diagram showing a saw-tooth-wave generator of FIG. 2 in detail.

On the other hand, the rectangular signals A outputted from VCO 11 are applied to a monostable multivibrator 51 (hereinafter referred to as M/M). The multivibrator provides a trigger signal having a pulse width which is determined by a time constant of M/M51. The trigger signal is supplied to a saw-tooth-wave generator 52 as shown in FIG. 3. In the saw-tooth-wave generator 52, when the trigger signal is non-active, a transistor 55 is turned off so that an integrating capacitor 51 is charged with a constant current $I_0$ from a constant current source 53. Accordingly, the potential across the capacitor 54 linearly increases as shown by a line $l_1$ of the waveform shown in FIG. 3. When the trigger signal from M/M51 is rendered active, the trigger signal is differentiated by a differentiating circuit comprising a capacitor 56, resistor 57 and diode 58 and is applied upon a base electrode of the transistor 55. Then the charge which has been accumulated by the integrating capacitor 54 is discharged through the transistor 55 as shown by a line $l_2$ of waveform in FIG. 3 so that the potential level across the capacitor 54 is returned to a ground level. In such a manner, a saw-tooth-wave signal J which is in synchronization with the oscillation output of VCO 11 is obtained across the integrating capacitor 54 and is outputted via a voltage follower connected operational amplifier 59 to a non-inverting input of the PWM (pulse width modulating) comparator 61. Data which are supplied in a bit-serial manner from an external device (not shown) such as microcomputor connected to a speed control terminal $T_3$ are converted into parallel data by a serial/parallel converter 65. The parallel output is applied to a D/A converter 66, the output of which is in turn applied to a non-inverting input of an error amplifier 62 as an analog speed control reference voltage V ref1. Output pulses from a rotary encoder of USM (not shown) connected to a terminal $T_4$ are smoothed by a F/V converting circuit comprising M/M63 and LPF 64 and are then applied to a non-inverting input of the error amplifier 62 as a d.c. voltage. The error amplifier 62 provides a pulse width modulating signal M to a non-inverting input of a PWM comparator 61 which compares the level of the pulse width modulating signal M with that of the saw-tooth-wave signal J to output a signal S having a pulse width variable in accordance with the change in output from the rotary encoder of USM81 at an output of PWM comparator 61. The signal having a variable pulse width S is applied to one input of each of the four two-input type AND gates 31, 32, 33 and 34 which form a driving pulse width changing circuit. These two-input AND gates 31, 32, 33 and 34 determine a logical product between a pulse S and each of the four phase signals $\phi_0$, $\phi_1$, $\phi_2$ and $\phi_3$ applied to another input of the gates 31, 32, 33 and 34 from the distributor 24 to provide four phase signals N, P, Q and R, the pulse width of which has been changed, to output transistors 41, 42, 44 and 45 respectively to control the driving time thereof. Accordingly, the collector current of each output transistor 41, 42, 44 and 45 is switched, resulting in that the electric power introduced to USM81 is changed.

In such a manner, power control of a USM with a PWM makes it possible to provide driving circuitry in which a desired motor speed can be obtained by the entry of speed control data. It is possible to provide a constant rotational motor speed by feeding back an encoder output representative of the rotational motor speed.

Having described a method of setting data for speed control in the afore-mentioned embodiment, it is apparent that the rotational speed of a motor can be changed by changing a voltage applied to a non-inverting input of the PWM comparator 61.

What is claimed is:

1. Circuitry for driving an ultrasonic motor in which a movable member which is in a frictional contact relationship with the surface of an elastic member is forcedly moved by applying an alternating voltage to a piezoelectric element secured to said elastic member to generate travelling vibration waves upon the surface of the elastic member, comprising;

a voltage controlled oscillator for generating rectangular waves having a frequency 4n times (where n is an integer) greater than that of said applied alternating voltage;

a distributor for separating said rectangular waves into four phase pulse wave ($\phi_0$, $\phi_1$, $\phi_2$ and $\phi_3$ wherein $\phi_0$ and $\phi_1$; $\phi_2$ and $\phi_3$ are 180° out-of-phase with each other, $\phi_0$ and $\phi_2$, $\phi_1$ and $\phi_3$ being 90° out-of-phase with each other);

a saw-tooth-wave generator for generating saw-tooth-wave signals which are in synchronization with said rectangular waves;

a pulse width modulating comparator for comparing the level of said saw-tooth-wave signals with that of a reference voltage;

a reference voltage adjusting means for changing said reference voltage in response to an external operation;

a driving pulse width changing circuit for changing the width of said four phase pulses in response to the output from said pulse width modulating comparator;

an output circuit which combines 180° out-of-phase pulses $\phi_0$ with $\phi_1$; $\phi_2$ with $\phi_3$, the pulse width of which have been changed by said driving pulse width changing circuit and amplifies the combined pulses to apply them to said piezoelectric element as two 90° out-of-phase alternating voltages;

a feed-back piezoelectric element secured to said elastic member for generating a feed back signal developed due to the piezoelectric effect on driving of the ultrasonic motor; and a driving frequency automatic tracking circuit responsive to said feed back signal for outputting to said voltage controlled oscillator a voltage signal representative of a difference between an optimum driving frequency and a current driving frequency.

2. Circuitry as defined in claim 1 in which said pulse width modulating comparator has an inverting input to which an output from said saw-tooth-wave generator is applied, a non-inverting input to which a pulse-width modulating signal is applied as a reference voltage and an output for outputting a pulse-width adjustable signal to said driving pulse width changing circuit.

3. Circuitry as defined in claim 2 in which said pulse width modulating signal is outputted from an error amplifier having an inverting input to which a d.c. voltage depending upon the output from a rotary encoder of said ultrasonic motor is applied, and a non-inverting input to which a speed controlling reference voltage depending upon external speed controlling data is applied.

4. Circuitry as defined in claim 3 in which said means for generating said pulse width modulating signal comprises a circuit for frequency-to-voltage converting the pulses from the rotary encoder of the ultrasonic motor, said frequency-to-voltage converting circuit having a monostable multivibrator, a low pass filter which smoothes the output from said multivibrator for outputting the smoothed signals to the inverting output of the error amplifier, a serial/parallel convertor for serial/parallel converting the speed controlling data supplied in a bit serial manner from an external device and a D/A convertor which digital-to-analog converts said parallel output and provides the converted analog output to the non-inverting input of the error amplifier as a controlling reference voltage.

5. A circuitry defined in claim 1 in which a monostable multivibrator which outputs to the saw-tooth-wave generator a trigger signal having a predetermined pulse width in synchronization with the VCO output is provided between the output of the voltage controlled oscillator and the saw-tooth-wave generator.

6. Circuitry as defined in claim 1 in which said saw-tooth-wave generator comprises a differential circuit to which is applied a trigger signal which is in synchronization with the output from the voltage controlled oscillator, an integrating circuit in which charging is carried out with a constant current from a constant current source, a switching element which controls the charging and discharging of said integrating circuit and an operational amplifier which provides an output from said integration circuit to an inverting output of the pulse width modulating comparator.

7. Circuitry for driving an ultrasonic motor in which a movable member which is in a frictional contact relationship with the surface of an elastic member is forcedly moved by applying an alternating voltage to a piezoelectric element secured to said elastic member to generate travelling vibration waves upon the surface of the elastic member, comprising;
   a pulse generator for generating rectangular pulses having a given width and a frequency which is 4n times (where n is an integer) greater than that of said alternating voltage to be applied to the ultrasonic motor;
   means for setting the rotational speed of the ultrasonic motor; and
   means for changing the width of the rectangular pulses in response to said setting means.

8. Circuitry for driving an ultrasonic motor comprising;
   a voltage controlled oscillator for generating rectangular waves having a frequency 4n times (where n is an integer) greater than the alternating voltage to be applied to the ultrasonic motor;
   a distributor for separating said rectangular waves into four phase pulse waves ($\phi_0$, $\phi_1$, $\phi_2$ and $\phi_3$) which occur at 90° phase intervals;
   a saw-tooth-wave generator responsive to said oscillator for generating saw-tooth-wave signals which are synchronized with said rectangular waves;
   a pulse width modulating comparator for comparing the level of said saw-tooth-wave signals with that of a reference voltage;
   reference voltage adjusting means for changing said reference voltage;
   a driving pulse width changing circuit for selectively changing the width of said four phase pulses in response to the output from said pulse width modulating comparator;
   an output circuit which combines 180° out-of-phase pulses $\phi_0$ with $\phi_1$; $\phi_2$ with $\phi_3$, the pulse widths of which have been changed by said driving pulse width changing circuit, and amplifies the combined pulses to apply them to said motor as two 90° out-of-phase alternating signals;
   feed-back means for generating a feed back signal responsive to the driving of said motor; and
   a driving frequency automatic tracking circuit responsive to said feed back signal for outputting to said voltage controlled oscillator a voltage signal representative of a difference between an optimum driving frequency and a current driving frequency.

9. A method for driving an ultrasonic motor in which a movable member is moved by applying an alternating voltage signals to inputs of a piezoelectric element secured to the elastic member to generate travelling vibration waves upon the surface of the elastic member, said method comprising the steps of:
   generating a train of rectangular pulses occurring at a frequency 4 times greater than that of the aforesaid applied alternating voltage;
   separating said pulse train into four pulse waves whose pulses occur at 90° phase intervals;
   generating a saw-tooth-wave signal synchronized with said rectangular pulses;
   generating pulses from said saw-tooth-wave signal whose pulse widths vary in accordance with an adjustable reference voltage;
   altering the pulse widths of the pulses in each of said four pulse waves according to the pulse widths of said varying pulse width pulses;
   combining the pulses of two of said separated pulse waves to form a first alternating voltage signal;
   combining the two remaining pulses of said separated pulse waves for forming a second alternating signal;
   applying said first and second alternating signals to respective inputs of said motor;
   generating a feed-back signal responsive to the piezoelectric effect on the driving of the ultrasonic motor; and
   adjusting the oscillator output according to the difference between the current driving frequency and an optimum driving frequency.

10. The method of claim 9 wherein said optimum driving frequency is obtained by dividing the oscillator frequency signal by four and comparing it with the current driving frequency.

11. A method for driving an ultrasonic motor in which a movable member which is in a frictional contact relationship with the surface of an elastic member is moved by applying alternating voltages to inputs of a piezoelectric element secured to said elastic member to generate travelling vibration waves upon the surface of the elastic member, said method comprising the steps of:
   generating rectangular pulses having a given width and frequency, which frequency is 4n times greater than said alternating voltage, where n is a real integer;
   utilizing at least certain of said pulses for developing an alternating voltage;
   selecting the rotational speed of the ultrasonic motor; and
   changing the width of at least said certain pulses responsive to the rotational setting speed.

12. A circuit for generating an alternating voltage signal for operating an ultrasonic motor, comprising:
   a voltage controlled oscillator for generating a pulse train having a frequency which is 4n times greater than the frequency of said alternating voltage signal, where n is a real integer;
   means for separating said pulses of said pulse train into four separate pulse trains comprising pulses which are spaced at 90° intervals;
   means responsive to said voltage controlled oscillator and a settable reference signal for generating pulses of varying pulse width according to said settable signal;

means for regulating the pulse width of the pulses in said separated pulse trains responsive to said variable pulse width signals;

means for combining two of said separated pulse trains for generating a first alternating voltage;

means for combining the two remaining separated pulse trains for producing a second alternating voltage;

said motor having first and second inputs for receiving said first and second alternating voltage signals.

13. The circuitry of claim 12 further including a feedback circuit applied to said motor for developing a feedback signal representative of the operating speed of said motor;

means for comparing said feedback signal with a signal derived from said voltage controlled oscillator for adjusting the output frequency of said voltage controlled oscillator according to the difference between said feedback signal and said derived signal.

14. The circuitry according to claim 13 wherein said means for deriving a signal from said voltage controlled oscillator comprises means for dividing the output of said voltage controlled oscillator signal by four.

15. The circuitry according to claim 12 further comprising means for generating an analog signal responsive to the output from the motor;

said analog signal comprising said setting signal.

16. The circuitry according to claim 15 further comprising means for developing a speed control signal from a control source;

means for combining said setting signal and said speed control signal.

17. The circuitry according to claim 16 wherein the control source is the output of a motor.

18. Circuitry for driving an ultrasonic motor with an alternating signal, comprising:

an ultrasonic motor having input means and output means;

a pulse generator for generating rectangular pulses having a given width and a frequency which is 4n times greater than the alternating signal applied to the ultrasonic motor (where n is an integer);

means for combining selected ones of said pulses;

means for applying said combined pulses to said input means;

means for setting the rotational speed of said motor; and means for changing the width of said rectangular pulses responsive to said setting means.

19. The circuitry of claim 18 further comprising:

means for adjusting the output frequency of said pulse generator responsive to the signal developed at the output means of said motor.

* * * * *

UNITED STATES PATENT AND TRADEMARK OFFICE
CERTIFICATE OF CORRECTION

PATENT NO. : 4,952,834

DATED : August 28, 1990

INVENTOR(S) : Junji Okada

It is certified that error appears in the above-identified patent and that said Letters Patent is hereby corrected as shown below:

Column 1, line 58, before "fII" insert --at--

Column 2, line 24, before "phase" insert --the--

Column 2, line 25, delete "the"

Column 3, line 4, before "FIG. 2" insert --within the circuitry of--

Column 7, line 3, change "A circuitry" to --Circuitry as--

Signed and Sealed this

Third Day of December, 1991

*Attest:*

HARRY F. MANBECK, JR.

*Attesting Officer*  *Commissioner of Patents and Trademarks*